(12) United States Patent
Takenaka et al.

(10) Patent No.: US 10,009,271 B2
(45) Date of Patent: *Jun. 26, 2018

(54) ROUTING METHOD AND NETWORK TRANSMISSION APPARATUS

(71) Applicant: FUJITSU LIMITED, Kawasaki-shi, Kanagawa (JP)

(72) Inventors: Masahiko Takenaka, Kawasaki (JP); Kunikazu Matsumoto, Kawasaki (JP); Daisuke Shinomiya, Kawasaki (JP); Yutaka Takahashi, Yokohama (JP); Hiroaki Sakai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/061,721

(22) Filed: Mar. 4, 2016

(65) Prior Publication Data

US 2016/0191387 A1 Jun. 30, 2016

Related U.S. Application Data

(63) Continuation of application No. 14/244,033, filed on Apr. 3, 2014, now Pat. No. 9,313,130, which is a
(Continued)

(51) Int. Cl.
  *H04L 12/741* (2013.01)
  *H04L 12/933* (2013.01)
  *H04L 12/721* (2013.01)

(52) U.S. Cl.
  CPC .......... *H04L 45/745* (2013.01); *H04L 45/72* (2013.01); *H04L 45/74* (2013.01); *H04L 49/15* (2013.01)

(58) Field of Classification Search
None
See application file for complete search history.

(56) References Cited

U.S. PATENT DOCUMENTS 5,815,664 A  9/1998  Asano
5,905,872 A  5/1999  DeSimone et al.
(Continued)

FOREIGN PATENT DOCUMENTS

AU    2005285185    3/2006
CA    2216266       5/1998
(Continued)

OTHER PUBLICATIONS

Akamai, "Akamai's Application Acceleration Services: Transform the Internet into a Business-Ready Application Delivery Platform", Oct. 2008.
(Continued)

*Primary Examiner* — Duc T Duong
(74) *Attorney, Agent, or Firm* — Fujitsu Patent Center

(57) ABSTRACT

It is determined whether or not the address of a first type specified in an address resolution query is an address that allows direct routing to a first network. If the direct routing is determined to be allowed, a routing table is configured such that a packet including, as a destination, the address of a second type obtained by the address resolution query is forwarded to the first network. If the direct routing is determined not to be allowed, the routing table is configured such that a packet including the obtained address of the second type as a destination is forwarded to a second network.

5 Claims, 17 Drawing Sheets

Related U.S. Application Data continuation of application No. PCT/JP2011/076116, filed on Nov. 11, 2011.

(56) References Cited

U.S. PATENT DOCUMENTS

| | | | |
|---|---|---|---|
| 6,108,703 | A | 8/2000 | Leighton et al. |
| 6,324,585 | B1* | 11/2001 | Zhang ............... H04L 29/12066 370/401 |
| 6,480,508 | B1* | 11/2002 | Mwikalo ........... H04L 29/12066 370/475 |
| 6,553,413 | B1 | 4/2003 | Leighton et al. |
| 2003/0007482 | A1* | 1/2003 | Khello ................ H04L 29/1216 370/352 |
| 2004/0139170 | A1 | 7/2004 | Shen |
| 2005/0111384 | A1 | 5/2005 | Ishihara et al. |
| 2005/0235044 | A1* | 10/2005 | Tazuma ............ G06F 17/30887 709/217 |
| 2006/0059551 | A1 | 3/2006 | Borella |
| 2008/0168181 | A1 | 7/2008 | Berkvens et al. |
| 2009/0112814 | A1* | 4/2009 | Statia ................ H04L 29/12066 |
| 2010/0186079 | A1* | 7/2010 | Nice .................... H04L 63/0281 726/14 |
| 2011/0010413 | A1* | 1/2011 | Christenson ...... H04L 29/12066 709/203 |
| 2011/0040861 | A1* | 2/2011 | Van der Merwe .............. H04L 29/08729 709/223 |
| 2011/0103303 | A1* | 5/2011 | Hsu ..................... H04W 76/022 370/328 |
| 2012/0158969 | A1* | 6/2012 | Dempsky ............ H04L 61/1511 709/226 |
| 2012/0173760 | A1* | 7/2012 | Jog .................... H04L 61/1511 709/245 |
| 2012/0179839 | A1 | 7/2012 | Raciborski |
| 2012/0191874 | A1* | 7/2012 | Robinson .......... H04L 29/12066 709/245 |
| 2013/0111040 | A1* | 5/2013 | Vempati ................ H04L 63/029 709/227 |
| 2013/0111066 | A1* | 5/2013 | Vempati ................ H04L 61/303 709/245 |
| 2013/0145045 | A1 | 6/2013 | Eastlake, III et al. |
| 2017/0257294 | A1* | 9/2017 | Santoro ................... H04L 43/08 |

FOREIGN PATENT DOCUMENTS

| | | |
|---|---|---|
| EP | 0848527 | 6/1998 |
| EP | 1807968 | 7/2007 |
| JP | 10-150470 | 6/1998 |
| JP | 2005-223449 | 8/2005 |
| JP | 2005-229309 | 8/2005 |
| JP | 2008-512958 | 4/2008 |
| JP | 2010-45617 | 2/2010 |
| JP | 2011-061774 | 3/2011 |
| WO | 2006/031594 | 3/2006 |

OTHER PUBLICATIONS

Akamai, "Improving Web Infrastructure Efficiency with Akamai, Strategies for Online Channels", 2009.

International Search Report, mailed in connection with PCT/JP2011/076116 and dated Dec. 13, 2011.

"Japanese Office Action" mailed by JPO and corresponding to Japanese Application No. 2013-542795 dated Apr. 14, 2015 with partial English translation (4 pages).

Sachio Goto, "Understand Optical Fibre to the Core", Network Magazine, vol. 9, Issue 10, ASCII 2 Corporation, Oct 1, 2004, pp. 60-79. Cited in Japanese Office Action dated Apr. 14, 2015 for corresponding Japanese Application No. 2013-542795 (cited herein) (22 pages).

USPTO, (Duong) Notice of Allowance and Notice of Allowability, dated Dec. 7, 2015, in parent U.S. Appl. No. 14/244,033 [allowed].

* cited by examiner

ROUTING METHOD AND NETWORK TRANSMISSION APPARATUS

CROSS-REFERENCE TO RELATED APPLICATION

This application is a continuation of application Ser. No. 14/244,033, filed Apr. 3, 2014, which is a continuation application of International Application PCT/JP2011/076116 filed on Nov. 11, 2011 which designated the U.S., the entire contents of which are incorporated herein by reference.

FIELD

The embodiments discussed herein relate to a routing method and a network transmission apparatus.

BACKGROUND

At present, many internal networks, such as Local Area Networks (LAN), intranets, or the like, are connected to a wide area network such as the Internet. A plurality of geographically separated internal networks may be connected to each other over a wide area network using a communication technology such as a Virtual Private Network (VPN).

For security purposes, a firewall (including so-called proxy server) may be installed at the boundary between an internal network and a wide area network. Some firewalls may perform layer 7 (application layer) protocol processing for inspecting the contents of communication in order to detect viruses or confidential information. However, a firewall that performs higher layer protocol processing is likely to suffer from an increased workload. In addition, if a single firewall is used to collectively inspect the communication of a large scale internal network, the workload of the firewall increases, which causes a long communication delay.

There has been proposed a router that makes a reverse Domain Name System (DNS) query to obtain a domain name for the Internet Protocol (IP) address of a packet and routes the packet on the basis of the obtained domain name and with reference to a domain name routing table. In addition, there has also been proposed a load balancer that forwards packets whose IP addresses are registered in a white list, to a white list dedicated server, and forwards packets whose IP addresses are not registered in the white list, to a normal server.

Please see, for example, Japanese Laid-open Patent Publications Nos. 2005-223449 and 2010-45617.

By the way, among services that are provided over a wide area network, there are highly authoritative services, such as well-known Web search services, update services of well-known software vendors, or the like. To reduce the workload for inspecting communication, there is considered a method of transmitting packets related to authoritative services and the other packets through different transmission paths (for example, in such a way that the former packets bypass a firewall and the latter packets pass through the firewall). However, there arises a problem about how to implement such control of transmission paths using a communication apparatus.

For example, there are some services in which accesses from clients are dynamically redirected to cache servers. In these services, it is difficult to identify which cache servers are used in each service in advance and, therefore, to determine based on a lower layer address (for example, IP address) included in each packet whether the packet is related to an authoritative service or not.

In addition, an organization that provides a service and an organization that runs a corresponding cache server may be different. In this case, even if a reverse query is used to resolve a lower layer address included in each packet to a higher layer address (for example, a host name including a domain name), the domain of the higher layer address just indicates the organization that runs the cache server. Therefore, it is also difficult to determine the authenticity of the service on the basis of the result of the reverse query.

Further, there is considered a method in which a communication apparatus that distributes packets performs higher layer protocol processing (for example, layer-7 Hypertext Transfer Protocol (HTTP) processing) to extract an original higher layer address from the contents of a packet. This method, however, needs a sophisticated communication apparatus and therefore is disadvantageous in terms of cost and workload.

SUMMARY

According to one aspect, there is provided a routing method for a network transmission apparatus connected to a first and a second network. The routing method includes: determining, upon receiving an address resolution query specifying an address of a first type from a client, whether direct routing to the first network is allowed or not, based on the address of the first type; querying the first network for address resolution to resolve the address of the first type when the direct routing to the first network is determined to be allowed, and querying the second network for the address resolution when the direct routing to the first network is determined not to be allowed; transmitting, to the client, an address response obtained from the first network or the second network by the querying, the address response including an address of a second type; configuring, when having queried the first network for the address resolution, a routing table such that a packet including, as a destination, the address of the second type that is included in the obtained address response is forwarded to the first network; and configuring, when having queried the second network for the address resolution, the routing table such that a packet including, as a destination, the address of the second type that is included in the obtained address response is forwarded to the second network.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
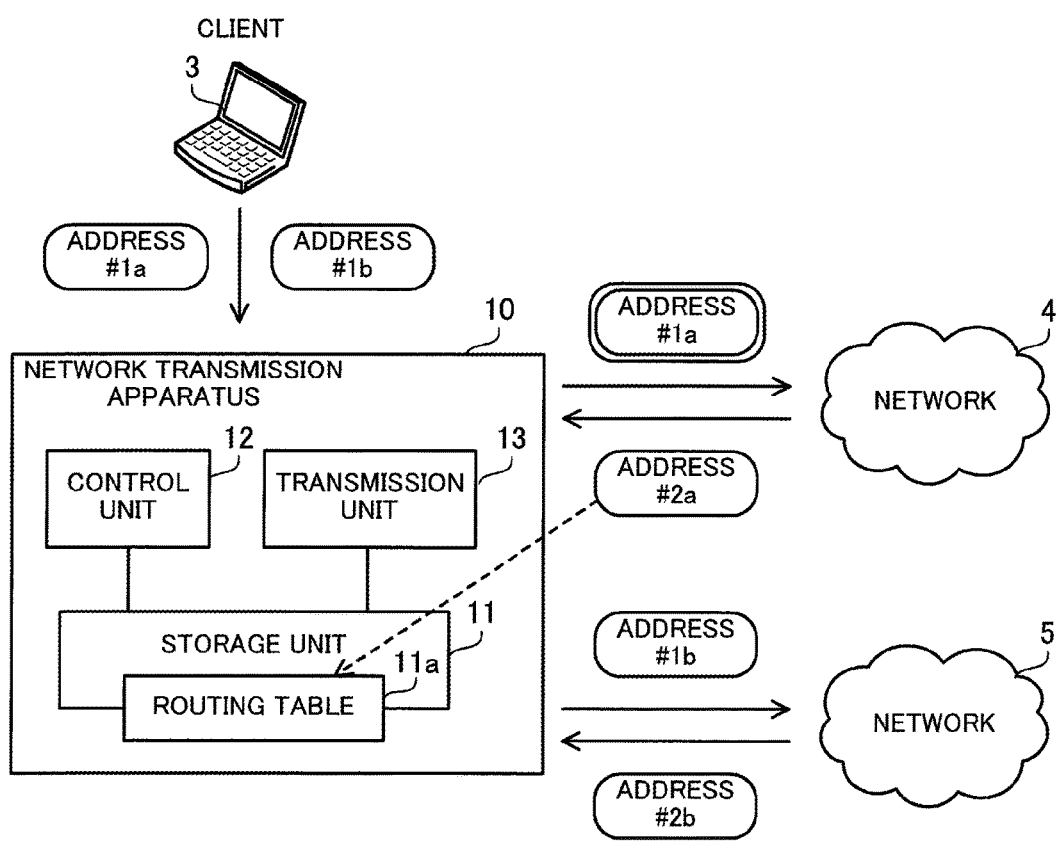
FIG. 1 illustrates a network transmission apparatus according to a first embodiment.

Several embodiments will be described below with reference to the accompanying drawings, wherein like reference numerals refer to like elements throughout.

(a) First Embodiment

FIG. 1 illustrates a network transmission apparatus according to a first embodiment. A network transmission apparatus 10 of the first embodiment is a communication apparatus that forwards packets received from a client 3 to networks 4 and 5.

The network transmission apparatus 10 is, for example, an egress router through which packets leave a LAN to which the client 3 belongs for the network 4. The network transmission apparatus 10 may be a router that performs protocol processing at layer 3 (for example, IP layer) and lower or at layer 4 (for example, Transmission Control Protocol (TCP) layer) and lower and does not perform layer 7 (application layer) protocol processing.

The client 3 is a computer that is, for example, used as a terminal device by a user. The network is, for example, a wide area network such as the Internet. The network 5 is, for example, a LAN or an intranet provided with a firewall. The network transmission apparatus 10 and the network 5 may be connected via a VPN configured on the network 4. For example, a packet sent from the client 3 is forwarded directly to the network 4, bypassing the network 5, or is forwarded to the network 4 via the network 5.

The network transmission apparatus 10 includes a storage unit 11, a control unit 12, and a transmission unit 13.

The storage unit 11 stores a routing table 11a. The storage unit 11 may be a volatile storage device, such as a Random Access Memory (RAM) or the like, or a nonvolatile storage device, such a flash memory or the like. The routing table 11a is referenced for determining based on the destination address of a packet (address of a second type, to be described later) whether to forward the packet to the network 4 or to the network 5. The routing table 11a may be used to register the destination addresses of packets to be forwarded to the network 4 (white list type) or to register the destination addresses of packets to be forwarded to the network 5 (black list type).

The control unit 12 deals with address resolution using an address resolution system, such as DNS or the like, and configures the routing table 11a based on the result of the address resolution. The control unit 12 may be implemented by using a processor, such as a Central Processing Unit (CPU), and a memory for storing programs, or may be implemented as hardware logic.

The control unit 12 receives an address resolution query that specifies an address of a first type (for example, a host name including a domain name), from the client 3. The address of the first type is entered from, for example, a Web browser running on the client 3. The control unit 12 determines whether or not the address of the first type specified in the address resolution query is an address that allows direct routing to the network 4 (for example, an address that allows bypassing of the network 5). Addresses that allow the direct routing are, for example, addresses related to authoritative services. It may be determined whether the direct routing is allowed or not, with reference to a prepared list containing authoritative addresses of the first type (white list type) or with reference to a prepared list containing non-authoritative addresses of the first type (black list type).

The control unit 12 queries the network 4 when determining that the direct routing to the network 4 is allowed, or queries the network 5 otherwise, in order to obtain an address of the second type (for example, IP address) corresponding to the address of the first type. The control unit 12 exercises control so as to forward an address response including the address of the second type to the client 3. After receiving the address response, the client 3 is able to send packets with the address of the second type as a destination address.

At this time, the control unit 12 determines that the address of the second type obtained by querying the network 4 is the address of an authoritative communication party and on the other hand, determines that the address of the second type obtained by querying the network 5 is not the address of an authoritative communication party. Then, the control unit 12 configures the routing table 11a on the basis of the determination result. For example, when the routing table 11a is of white list type, the control unit 12 registers the addresses of the second type for authoritative communication parties (addresses of the second type obtained from the network 4) in the routing table 11a.

The transmission unit 13 forwards each packet received from the client 3, on the basis of the address of the second type included as a destination address in the packet and with reference to the routing table 11a stored in the storage unit 11. The transmission unit 13 forwards, to the network 4, packets including addresses of the second type (addresses of the second type obtained by querying the network 4) that are determined to be the addresses of authoritative communication parties. On the other hand, the transmission unit 13 forwards, to the network 5, packets including addresses of the second type (addresses of the second type obtained by querying the network 5) that are determined not to be the addresses of authoritative communication parties.

For example, packets addressed to authoritative communication parties are forwarded to the network 4, bypassing the network 5, while packets that are not addressed to authoritative communication parties are forwarded to the network 4 via the network 5. On the network 5, for example, a firewall inspects the contents of the packets and blocks packets having inappropriate contents. In the case where the network transmission apparatus 10 and the network 5 are connected with a virtual network technology, for example, the network transmission apparatus 10 forwards packets addressed to authoritative communication parties, to the network 4 without encapsulating them, and on the other hand, encapsulates and forwards packets that are not addressed to authoritative communication parties, to the network 5.

With the network transmission apparatus 10 of the first embodiment, it is easy to change the transmission path of a packet depending on the authenticity of service. The network transmission apparatus 10 is able to use higher-layer addresses of the first type to specify services for which direct routing to the network 4 is allowed. Therefore, unlike the case of just using lower-layer addresses of the second type, this approach is effective for services that dynamically redirect accesses made by the client 3, to cache servers.

In addition, the network transmission apparatus 10 may not need to perform higher layer protocol processing, such as layer-7 HTTP processing, on each packet, and may be designed to perform protocol processing at layer 3 and lower or at layer 4 and lower. This reduces the workload of the network transmission apparatus 10 for the protocol processing, and a high-cost communication apparatus may not need to be used as the network transmission apparatus 10.

Further, the network transmission apparatus 10 may be designed to allow, among packets sent from the client 3 to the network 4, packets addressed to authoritative communication parties to bypass a firewall configured on the network 5 and to cause the other packets to pass through the firewall. This approach reduces the workload of the firewall, compared with the case of forwarding all packets sent from the client 3 to the network 4, to the firewall.

(b) Second Embodiment

A second embodiment will be described next. The following mainly describes differences from the first embodiment, and the same features as the first embodiment will not be described again.

Figure 2:
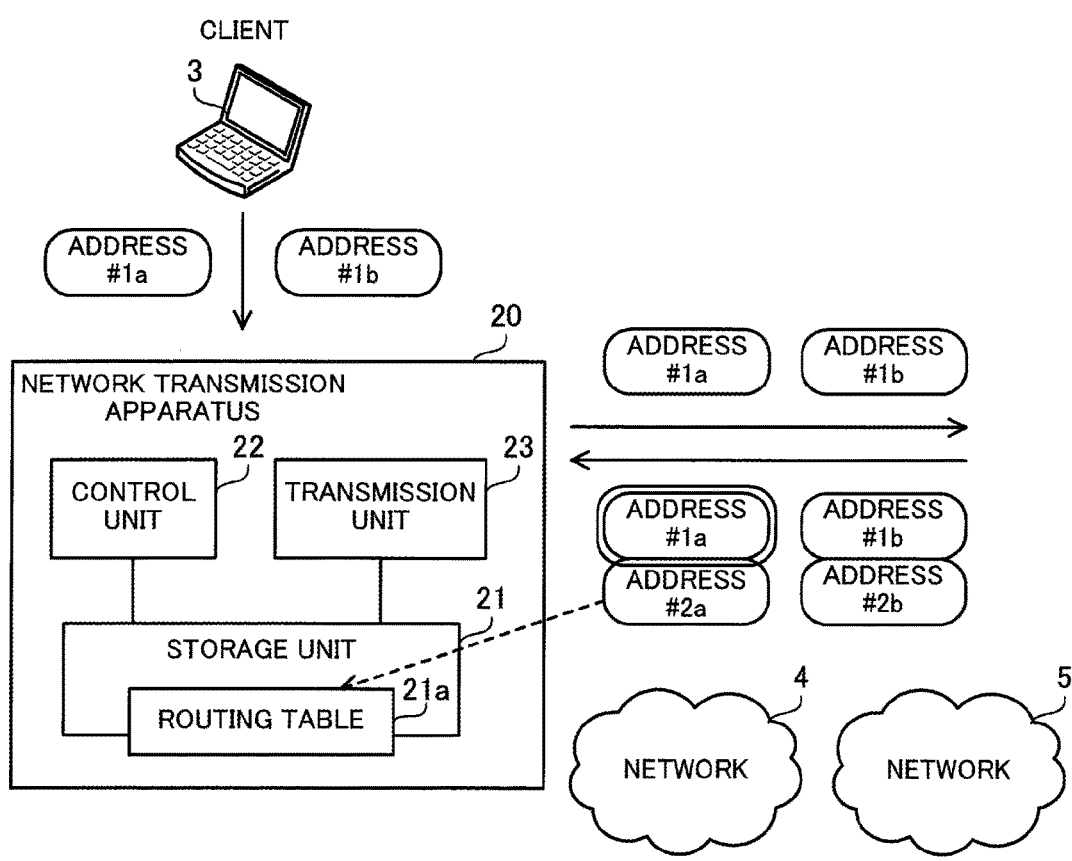
FIG. 2 illustrates a network transmission apparatus according to a second embodiment.

FIG. 2 illustrates a network transmission apparatus according to the second embodiment. A network transmission apparatus 20 of the second embodiment includes a storage unit 21, a control unit 22, and a transmission unit 23. The storage unit 21, control unit 22, and transmission unit 23 correspond to the above-described storage unit 11, control unit 12, and transmission unit 13, respectively.

The storage unit 21 stores a routing table 21a.

The control unit 22 exercises control so as to forward an address resolution query sent from a client 3, to a network 4 or to a network 5 (preferably, to the network 5). Then, the control unit 22 exercises control so as to forward an address response received in response to the address resolution query, to the client 3. The address response includes an address of a first type (for example, a host name including a domain name) specified by the client 3, and an address of a second type (for example, IP address) that is an answer to the query.

The control unit 22 determines whether or not the address of the first type included in the address response is an address that allows direct routing to the network 4 (for example, an address that allows bypassing of the network 5). Addresses that allow the direct routing are addresses related to authoritative services, for example. It may be determined whether the direct routing is allowed or not, with reference to a prepared white list or black list regarding addresses of the first type. When determining that the direct routing to the network 4 is allowed, the control unit 22 determines that the address of the second type included in the address response is the address of an authoritative communication party. When determining that the direct routing to the network 4 is not allowed, the control unit 22 determines that the address of the second type is not the address of an authoritative communication party.

Then, the control unit 22 configures the routing table 21a on the basis of the determination result. For example, in the case where the routing table 21a is of white list type, the control unit 22 registers addresses of the second type of authoritative communication parties (corresponding to addresses of the first type that were determined to allow direct routing) in the routing table 21a.

The transmission unit 23 forwards each packet received from the client 3, on the basis of the address of the second type included as a destination address in the packet and with reference to the routing table 21a stored in the storage unit 21. The transmission unit 23 forwards, to the network 4, packets including the addresses of the second type determined to be the addresses of authoritative communication parties (corresponding to the addresses of the first type determined to allow direct routing). On the other hand, the transmission unit 23 forwards, to the network 5, packets including the addresses of the second type determined not to be the addresses of authoritative communication parties (corresponding to the addresses of the first type determined not to allow direct routing).

With the network transmission apparatus 20 of the second embodiment, it is easy to change the transmission path of a packet according to the authenticity of service, as in the case of the first embodiment. That is, the network transmission apparatus 20 is also effective for services that dynamically redirect accesses made by the client 3, to cache servers. In addition, it is possible to reduce the workload of the network transmission apparatus 20 for the protocol processing, and a high-cost communication apparatus may not need to be used as the network transmission apparatus 20. Further, the network transmission apparatus 20 may be designed so as to allow packets addressed to authoritative communication parties to bypass a firewall configured on the network 5 and to cause the other packets to pass through the firewall.

(c) Third Embodiment

Figure 3:
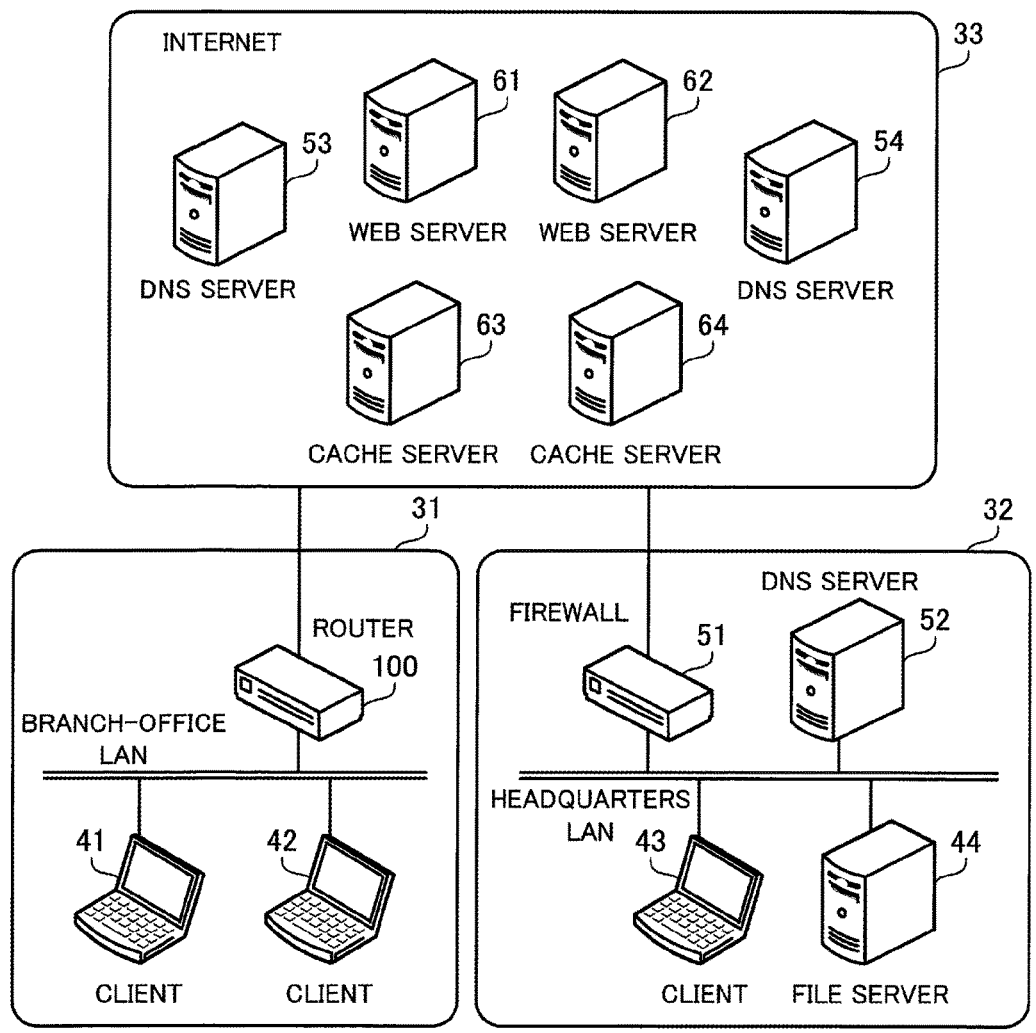
FIG. 3 illustrates a communication system according to a third embodiment.

FIG. 3 illustrates a communication system according to a third embodiment. The third embodiment uses an example in which an intranet for a company including headquarters and branch offices is connected to the Internet.

A communication system of the third embodiment includes a branch office LAN 31, a headquarters LAN 32, and the Internet 33. Each of the branch office LAN 31 and the headquarters LAN 32 is connected to the Internet 33. The branch office LAN 31 includes clients 41 and 42 and a router 100. The headquarters LAN 32 includes a client 43, a file server 44, a firewall 51, and a DNS server 52. The Internet 33 includes DNS servers 53 and 54, Web servers 61 and 62, and cache servers 63 and 64.

The clients 41, 42, and 43 are computers that are used as terminal devices by users. Each of the clients 41, 42, and 43 is able to use a Web browser to access the Web servers 61 and 62 and the cache servers 63 and 64 on the Internet 33. In addition, the clients 41 and 42 are also able to access the file server 44 over the Internet 33, and the client 43 is able to access the file server 44. The file server 44 is a server computer that holds files that are used in the business operation at the headquarters and branch offices.

The firewall 51 is a communication apparatus that monitors communications between the intranet including the branch-office LAN 31 and the headquarters LAN 32 and the Internet 33. The firewall 51 performs, for example, application layer protocol processing in order to detect communication including fraudulent contents, such as virus or confidential information. A so-called proxy server may be used as the firewall 51. The branch-office LAN 31 and the headquarters LAN 32 are connected via a VPN (so-called Internet VPN) configured on the Internet 33. Packets communicated between the branch-office LAN 31 and the Internet 33 pass through the firewall 51 of the headquarters LAN 32, except for packets related to authoritative services, as will be described later.

The DNS servers 52, 53, and 54 are server computers for managing mappings between host names and IP addresses. The DNS server 52, 53, and 54 receives a DNS request including a Full Qualified Domain Name (FQDN), and returns a DNS response including an IP address corresponding to the FQDN. A FQDN is a host name including a domain name. When the DNS server 52, 53, and is not responsible for address resolution for the specified FQDN, the DNS server queries another DNS server. For example, when receiving a query for the IP address of the Web server 62 from the client 41, the DNS server 52 may query the DNS server 54. In this connection, the DNS server 53 is installed closer to the branch-office LAN 31, while the DNS server 54 is installed closer to the headquarters LAN 32.

The Web servers 61 and 62 are server computers that provide services, such as search services, software update services, or the like. The Web servers 61 and 62 transmit, for example, files, such as HyperText Markup Language (HTML) documents, software programs, or the like, in response to HTTP accesses from the clients 41, 42, and 43. The cache servers 63 and 64 are server computers that hold copies of files stored in the Web server 61. Accesses from the clients 41, 42, and 43 to the Web server 61 may be redirected to the cache servers 63 and 64. In this connection, the cache server 63 is installed closer to the branch-office LAN 31, while the cache server 64 is installed closer to the headquarters LAN 32.

The Web servers 61 and 62 and the cache servers 63 and 64 are given different FQDNs and different IP addresses. An organization that provides services using the Web server 61 and an organization that runs the cache servers 63 and 64 may be different. Therefore, the domain name included in the FQDN of the Web server 61 and the domain name included in the FQDNs of the cache servers 63 and 64 may be different. An access to the Web server 61 may be redirected to a cache server 63 and 64 in the following manner.

In a DNS server responsible for the Web server 61, the domain name of the cache servers 63 and 64 is registered as an alias (CNAME) of the FQDN of the Web server 61. When receiving a DNS request including the FQDN of the Web server 61, the DNS server responsible for the Web server 61 forwards the DNS request to the DNS server responsible for the cache servers 63 and 64 because a domain name different from that of the Web server 61 is registered as an alias. The DNS server responsible for the cache servers 63 and 64 searches for a cache server that is located geographically closer to the transmission source of the DNS request, based on the IP address of the transmission source, and returns the IP address of the cache server.

A client 41, 42, and 43 is notified of the IP address of a cache server closer to the client, as the IP address corresponding to the FQDN of the Web server 61. After that, the client 41, 42, and 42 makes access to the cache server closer to the client, instead of the Web server 61. This makes it possible to distribute the workload of the Web server 61 and cache servers 63 and 64.

Akamai is one of such cache services. The cache services are described in the following documents: A white paper "Akamai's Application Acceleration Services: Transform the Internet into Business-Ready Application Delivery Platform", Akamai Technologies, 2009; A white paper "Akamai's Improving Web Infrastructure Efficiency: Strategies for Online Channels", Akamai Technologies, 2009; U.S. Pat. No. 6,108,703; and U.S. Pat. No. 6,553,413.

The router 100 is located at a border between the branch-office LAN 31 and the Internet 33, and communicates with the headquarters LAN 32 and the Internet 33. The router 100 may perform protocol processing at the IP layer and lower or at the TCP layer and lower on each packet, and may not need to perform application layer protocol processing. In addition, the router 100 may not be provided with a firewall function. The router 100 forwards packets related to specified authoritative services, among the packets sent from the clients 41 and 42 to the Internet 33, directly to the Internet 33, bypassing the firewall 51. On the other hand, the router 100 forwards the other packets to the firewall 51 over the Internet VPN.

On the headquarters LAN 32, the firewall 51 may act as a termination point of the VPN, or another communication apparatus may be used to terminate the VPN. The communication between the headquarters LAN 32 and the branch-office LAN 31 may or may not be designed to pass through the firewall 51.

In this connection, in the third embodiment, the headquarters LAN 32 and the Internet 33 are examples of the network 5 and the network 4 of the first embodiment, respectively. The router 100 is one example of the network transmission apparatus 10 of the first embodiment, and the clients 41 and 42 are one example of the client 3 of the first embodiment.

Figure 4:
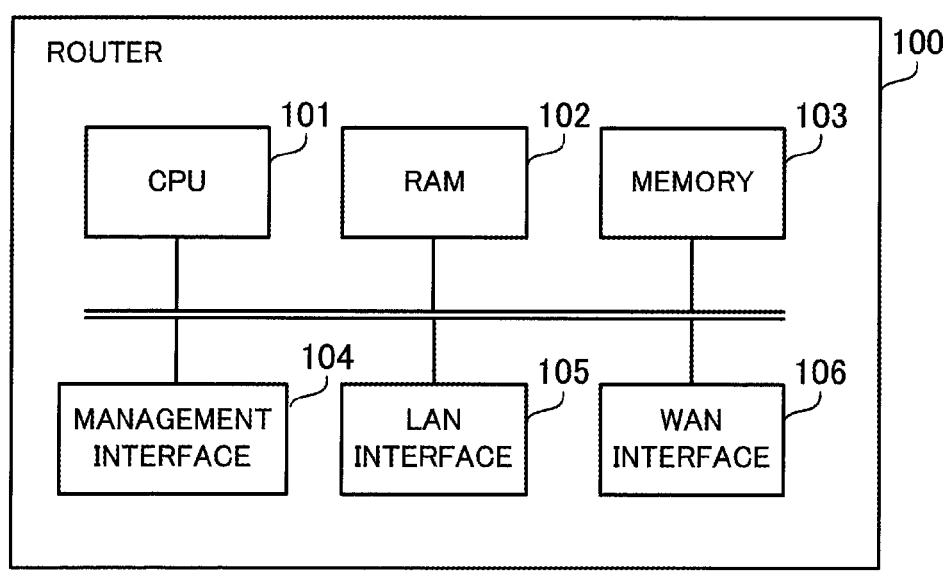
FIG. 4 is a block diagram illustrating an example of a hardware configuration of a router.

FIG. 4 is a block diagram illustrating an example of a hardware configuration of a router. The router 100 includes a CPU 101, a RAM 102, a memory 103, a management interface 104, a LAN interface 105, and a Wide Area Network (WAN) interface 106.

The CPU 101 is a processor that processes packets in accordance with a program. The CPU 101 loads programs or control data from the memory 103 to the RAM 102. The RAM 102 is a volatile memory that temporarily stores part or all of programs and control data that are used by the CPU 101. The memory 103 is a non-volatile memory that stores the programs and control data, and is, for example, a flash memory. In this connection, the router 100 may be provided with other kinds of storage devices, instead of the RAM 102 and the memory 103.

The management interface 104 is a communication interface that is provided with a management port capable of connecting to clients under management. The LAN interface 105 is a communication interface that is provided with a LAN port capable of connecting to another communication apparatus (for example, layer 2 switch) of the branch-office LAN 31. The WAN interface 106 is a communication interface that is provided with a WAN port capable of connecting to the Internet 33. The LAN interface 105 and WAN interface 106 forward packets under the control of the CPU 101.

In the third embodiment, IP layer protocol processing, including routing, is performed using software. However, the protocol processing may be performed using hardware.

Some or all of the functions of the router 100, which will be described below, may be implemented as hardware logic.

Figure 5:
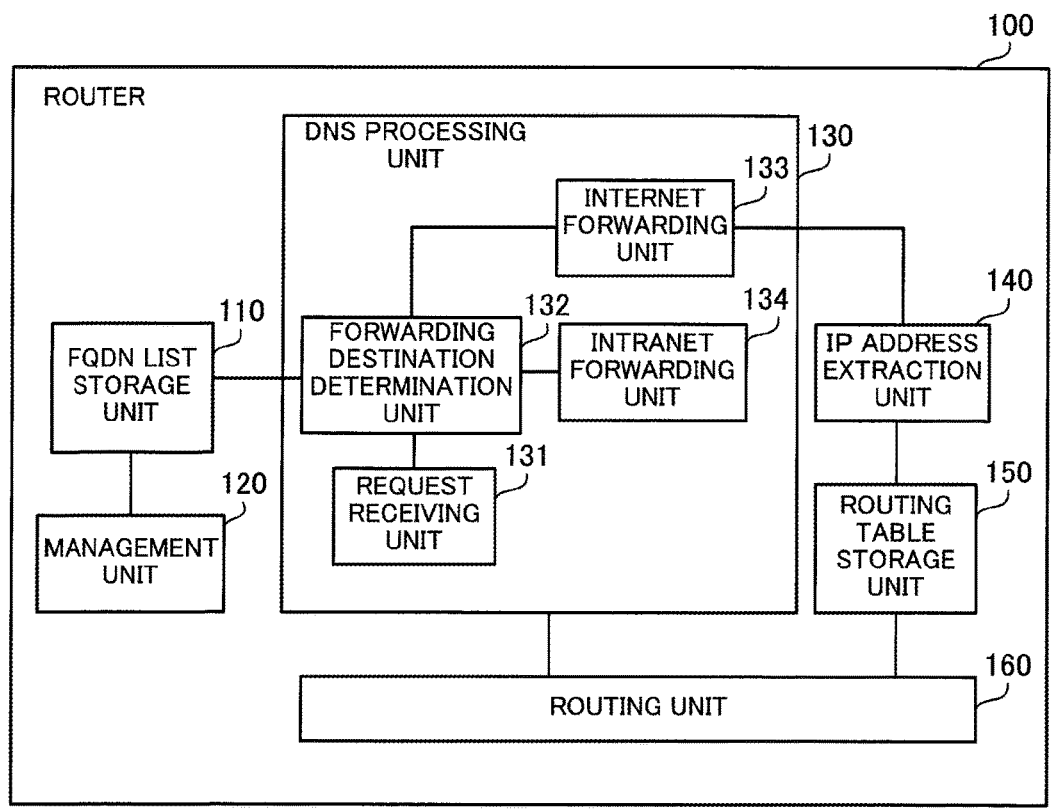
FIG. 5 is a block diagram illustrating an example of a software configuration according to the third embodiment.

FIG. 5 is a block diagram illustrating an example of a software configuration according to the third embodiment. The router 100 includes a FQDN list storage unit 110, a management unit 120, a DNS processing unit 130, an IP address extraction unit 140, a routing table storage unit 150, and a routing unit 160. The FQDN list storage unit 110 and the routing table storage unit 150 are implemented as storage areas prepared in the RAM 102 or the memory 103. The management unit 120, the DNS processing unit 130, the IP address extraction unit 140, and the routing unit 160 are implemented as program modules to be executed by the CPU 101.

The FQDN list storage unit 110 stores a FQDN list. The FQDN list is a white list that contains FQDNs to specify authoritative services. In the FQDN list, wildcard "*" may be used for the FQDNs. For example, in the case where the FQDN list includes "*.aaa.bbb", "www.aaa.bbb" is determined to be a FQDN registered in the FQDN list.

The management unit 120 changes the setting of the router 100 in accordance with commands entered from a client used by an administrator. The commands are entered via the management interface 104 or LAN interface 105. The management unit 120 receives a command for adding a FQDN to the FQDN list or a command for removing a FQDN from the FQDN list, and updates the FQDN list stored in the FQDN list storage unit 110.

The DNS processing unit 130 performs a DNS relay function of forwarding DNS requests and DNS responses between the clients 41 and 42 and the DNS servers 52, 53, and 54. Because of this DNS relay function, the router 100 is recognized as a DNS server by the clients 41 and 42. The DNS processing unit 130 includes a request receiving unit 131, a forwarding destination determination unit 132, an Internet forwarding unit 133, and an intranet forwarding unit 134.

The request receiving unit 131 receives DNS requests from the clients 41 and 42, and returns DNS responses obtained from the Internet 33 or the headquarters LAN 32. The forwarding destination determination unit 132 determines whether the FQDN included in a DNS request is registered in the FQDN list stored in the FQDN list storage unit 110 or not, i.e., whether the FQDN is the FQDN of an authoritative service or not. If the FQDN is registered, the forwarding destination determination unit 132 determines to forward the DNS request to the Internet 33. Otherwise, the forwarding destination determination unit 132 determines to forward the DNS request to the headquarters LAN 32.

The Internet forwarding unit 133 forwards a DNS request to a DNS server (for example, DNS server 53) on the Internet 33 according to the determination result obtained by the forwarding destination determination unit 132, and obtains a DNS response from the DNS server. In addition, the Internet forwarding unit 133 outputs the DNS response to the IP address extraction unit 140. The intranet forwarding unit 134 forwards a DNS request to the DNS server 52 of the headquarters LAN 32 according to the determination result obtained by the forwarding destination determination unit 132, and obtains a DNS response from the DNS server 52.

The IP address extraction unit 140 obtains, from the DNS processing unit 130, DNS responses obtained from the Internet 33 from among those obtained from the Internet 33 and the headquarters LAN 32. The IP address extraction unit 140 extracts the IP address that is an answer to a query, from a DNS response, and registers the extracted IP address as the IP address of an authoritative communication party in the routing table stored in the routing table storage unit 150.

The routing table storage unit 150 stores the routing table. The routing table is a white list that contains the IP addresses of authoritative communication parties among those used outside the branch-office LAN 31 and the headquarters LAN 32. In this connection, the third embodiment defines the FQDN list and the routing table as white lists. Alternatively, these may be set as black lists that contain non-authoritative addresses.

The routing unit 160 routes each packet on the basis of the IP address included as a destination address in the packet. In order to determine the forwarding destination of a packet sent from the client 41 and 42 to the Internet 33, the routing unit 160 refers to the routing table stored in the routing table storage unit 150. The routing unit 160 forwards a packet addressed to an IP address (authoritative communication party) that is registered in the routing table, directly to the Internet 33. On the other hand, the routing unit 160 forwards a packet addressed to an IP address (non-authoritative communication party) that is not registered in the routing table, to the headquarters LAN 32 using the Internet VPN.

In this connection, in principle, a transmission path (return path) through which a packet is returned from the Internet 33 to the client 41 and 42 is the same as a transmission path (outward path) of the packet from the client 41 and 42 to the Internet 33. The routing unit 160 encapsulates a packet to be transmitted to the headquarters LAN 32 for the Internet VPN, and de-encapsulates a packet received from the headquarters LAN 32 through the Internet VPN. That is, the routing unit 160 serves as a termination point of the Internet VPN.

Figure 6:
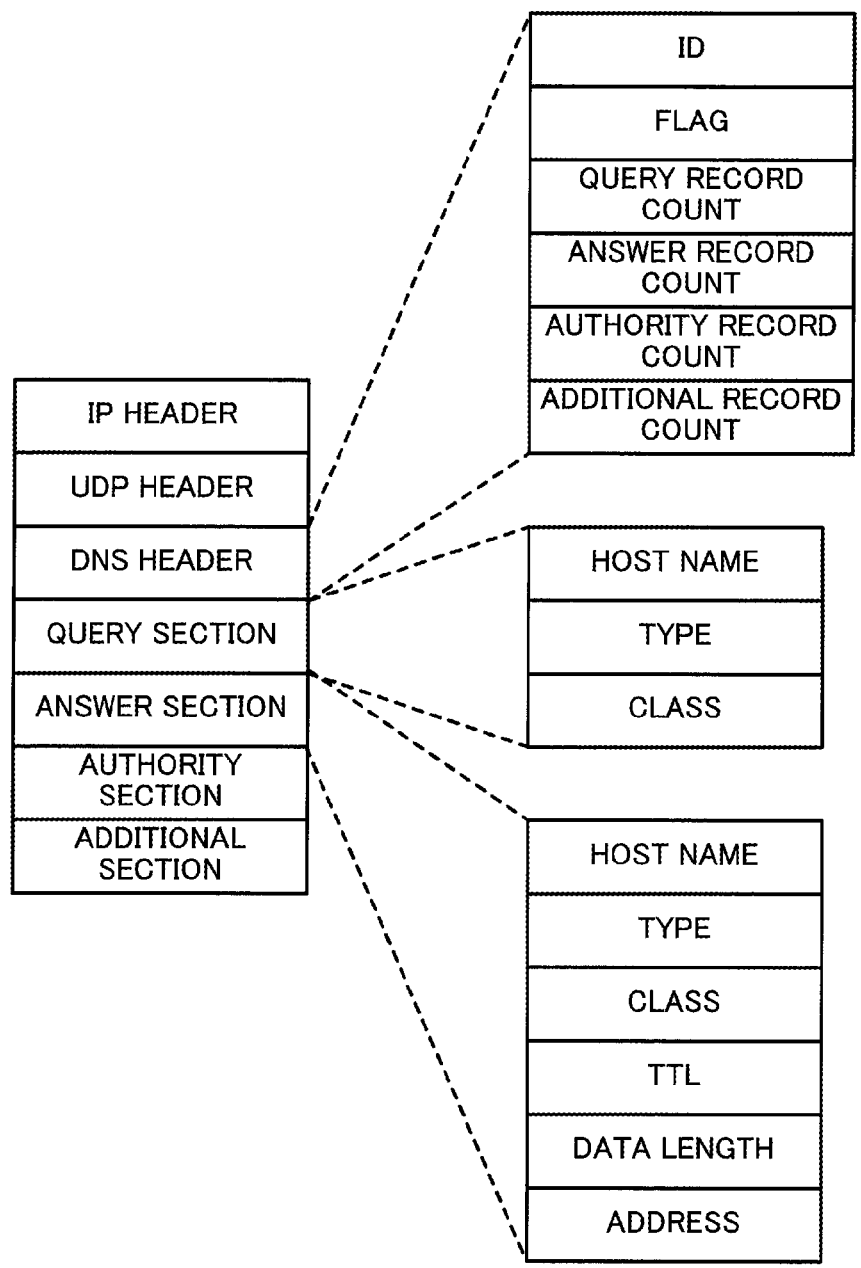
FIG. 6 illustrates an example of a format of a DNS packet.

FIG. 6 illustrates an example of a format of a DNS packet. A DNS packet includes an IP header, a User Datagram Protocol (UDP) header, a DNS header, and a payload. When the DNS packet is a DNS request, the payload includes a query section. When the DNS packet is a DNS response, the payload includes a query section, an answer section, an authority section, and an additional section.

The DNS header includes an Identifier (ID), a flag, a query record count, an answer record count, an authority record count, and an additional record count. The ID is a 16-bit (2-byte) identifier for identifying a DNS transaction, and a DNS request and its corresponding DNS response have the same ID. The flag is a set of control bits including bits that distinguish a DNS request and a DNS response. The query record count indicates the number of records included in the query section. The answer record count indicates the number of records included in the answer section. The authority record count indicates the number of records included in the authority section. The additional record count indicates the number of records included in the additional section.

Each record in the query section includes a host name, a type, and a class. The host name is a FQDN to be resolved. The type indicates what kind of information is requested as an answer. In the case of a forward resolution query for obtaining the IP address of a device indicated by a FQDN, the type of "A" is specified. As the class, "IN" indicating the Internet is specified.

Each record of the answer section includes a host name, a type, a class, a valid time (Time To Live (TTL)), a data length, and an address. The host name is the FQDN of a device having the address indicated in the answer section. In the case where the IP address of a cache server 63 and 64 is returned as an answer, or other cases, the host name in the query section and the host name in the answer section may not be the same. The same type and the same class as those in the query section are used in the answer section. TTL is a limit on the period of time for the result of address resolution. The result of the address resolution is cached until the time limit expires. The data length indicates the number of bytes of the address column. The address is an answer to a query and, for example, is an IP address.

The record in the authority section includes the FQDN of a DNS server that is authorized for managing the host name indicated in the answer section. The record in the additional section includes additional information other than the above and, for example, includes the IP address of a DNS server indicated in the authority section.

Figure 7:
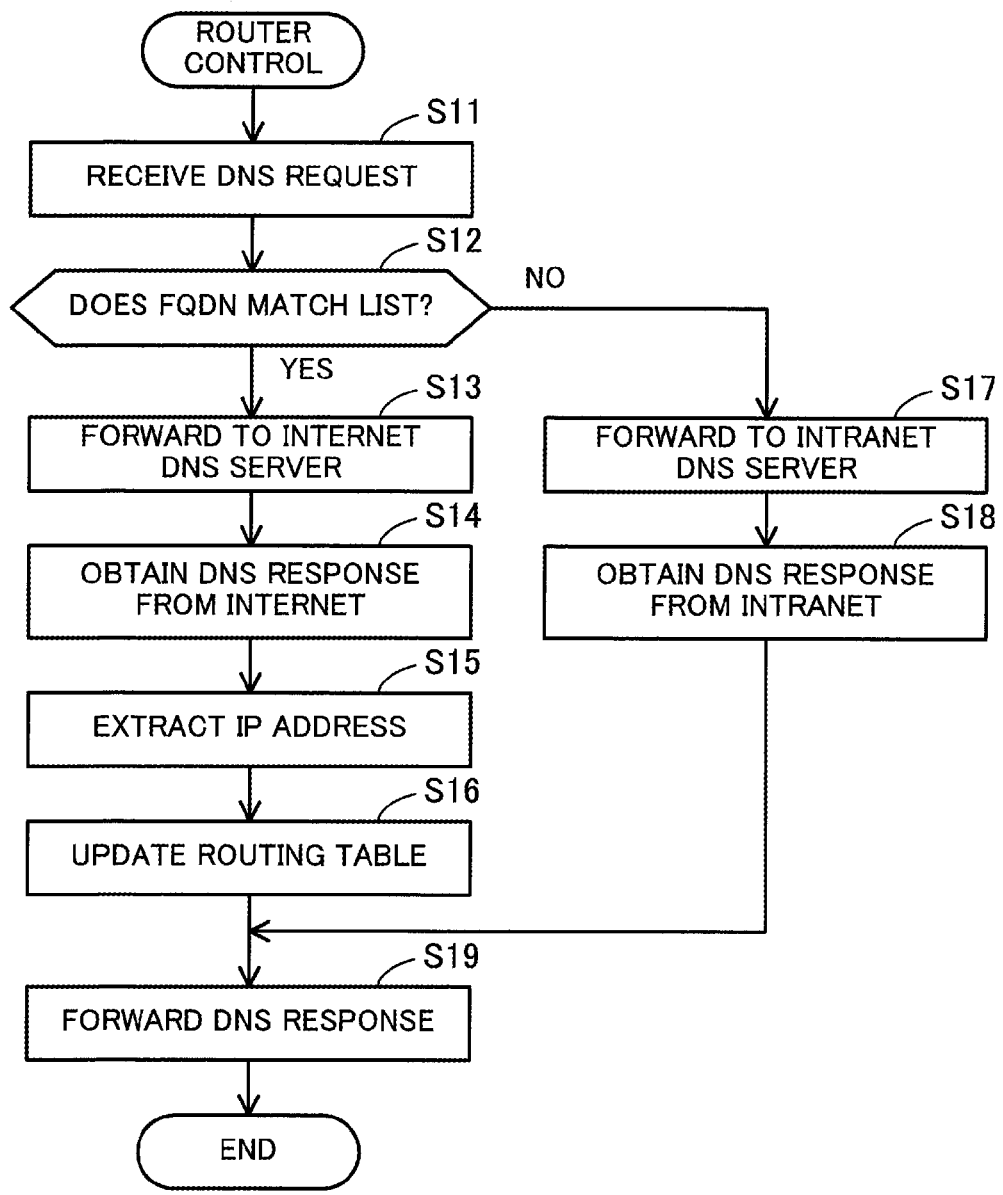
FIG. 7 is a flowchart illustrating router control according to the third embodiment.

FIG. 7 is a flowchart illustrating router control according to the third embodiment. The following example is that the client 41 sends a DNS request.

(Step S11) The request receiving unit 131 receives the DNS request.

(Step S12) The forwarding destination determination unit 132 extracts a FQDN from the DNS request, and compares the extracted FQDN with the FQDN list stored in the FQDN list storage unit 110. The forwarding destination determination unit 132 determines whether the FQDN extracted from the DNS request matches the FQDN list (is registered in the FQDN list) or not. If a match is found, the forwarding destination determination unit 132 determines that the FQDN is the FQDN of an authoritative service, and then the process proceeds to step S13. If no match is found, then the forwarding destination determination unit 132 determines that the FQDN is not the FQDN of an authoritative service, and then the process proceeds to step S17.

(Step S13) The Internet forwarding unit 133 forwards the DNS request to a DNS server (for example, DNS server 53) on the Internet 33.

(Step S14) The Internet forwarding unit 133 obtains a DNS response to the DNS request, from the DNS server (for example, DNS server 53) on the Internet 33.

(Step S15) The IP address extraction unit 140 extracts an IP address from the DNS response, and determines that the IP address is the IP address of an authoritative communication party.

(Step S16) The IP address extraction unit 140 registers the extracted IP address in the routing table stored in the routing table storage unit 150. Then, the process proceeds to step S19. In case where a mapping between a service and an IP address is changed, such as the case where a cache server to be used is changed, it is so designed that IP addresses listed for a specified time period after being registered may be removed.

(Step S17) The intranet forwarding unit 134 forwards the DNS request to the DNS server 52 of the headquarters LAN 32. In this connection, the DNS request packet is encapsulated for the Internet VPN, and is forwarded between the router 100 and the headquarters LAN 32.

(Step S18) The intranet forwarding unit 134 obtains a DNS response to the DNS request from the DNS server 52 of the headquarters LAN 32. Similarly to the DNS request, the DNS response packet is encapsulated for the Internet VPN, and is forwarded. In this connection, the IP address included in the DNS response obtained from the headquarters LAN 32 is determined not to be the IP address of an authoritative communication party, and so is not registered in the routing table.

(Step S19) The request receiving unit 131 forwards the DNS response obtained from the Internet 33 or the headquarters LAN 32, to the client 41 that has sent the DNS request. In this connection, when a DNS request is forwarded to the Internet 33, the above steps S15 and S16 and step S19 may be executed in parallel, or these steps may be executed in a reverse order.

Figure 8:
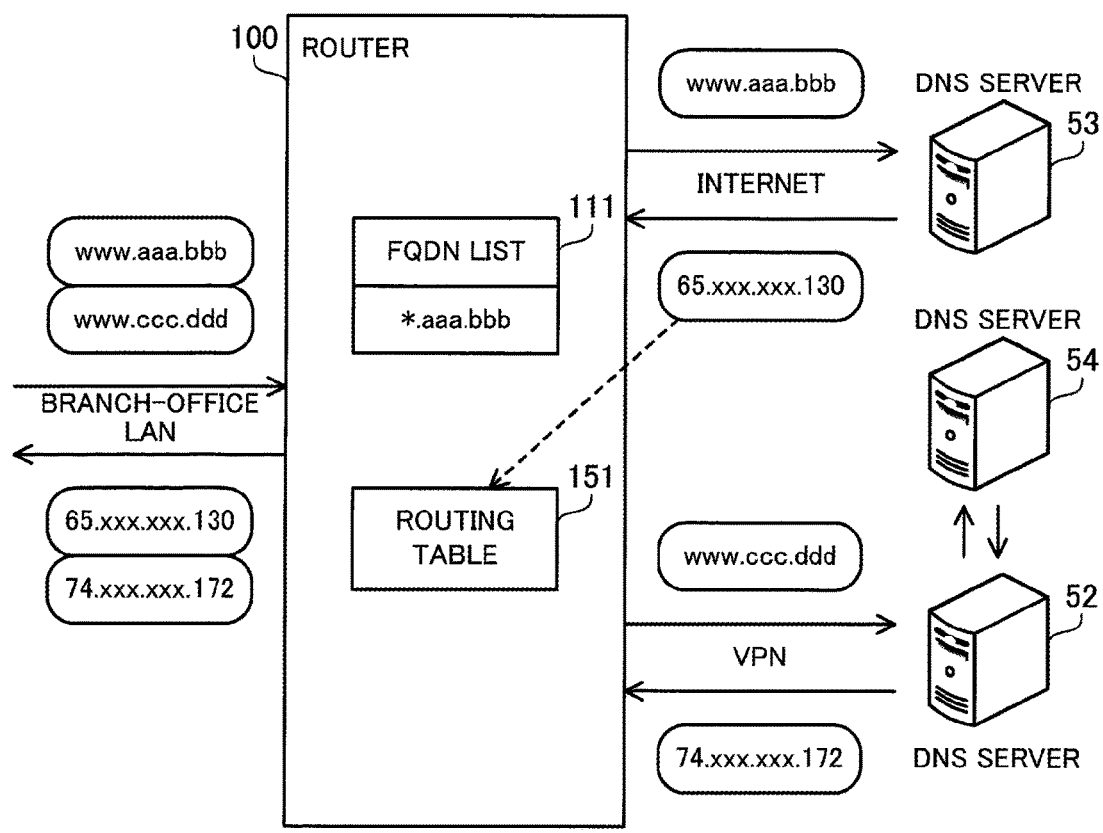
FIG. 8 illustrates an example of DNS processing according to the third embodiment.

FIG. 8 illustrates an example of DNS processing according to the third embodiment. This example is that the client 41 performs address resolution using the DNS (DNS phase). In addition, assume that "*.aaa.bbb" is registered in the FQDN list 111 of the router 100.

When the client 41 sends a DNS request that specifies "www.aaa.bbb", the router 100 confirms that the specified FQDN is registered in the FQDN list 111. Therefore, the router 100 determines that the FQDN is authoritative, and then forwards the DNS request to the DNS server 53 on the Internet 33. When receiving a DNS response including "65.xxx.xxx.130" from the DNS server 53, the router 100 determines that the IP address is authoritative, and then registers the IP address in the routing table 151. The router 100 also forwards the received DNS response to the client 41.

When the client 41 sends a DNS request that specifies "www.ccc.ddd", the router 100 confirms that the specified FQDN is not registered in the FQDN list 111. Therefore, the router 100 determines that the specified FQDN is non-authoritative, and forwards the DNS request to the DNS server 52 of the headquarters LAN 32. The DNS server 52 queries, for example, the DNS server 54 on the Internet 33 to search for an IP address. The router 100 receives a DNS response including "74.xxx.xxx.172" from the DNS server 52, and forwards the received DNS response to the client 41. At this time, the IP address is determined to be non-authoritative, and so is not registered in the routing table 151.

Figure 9:
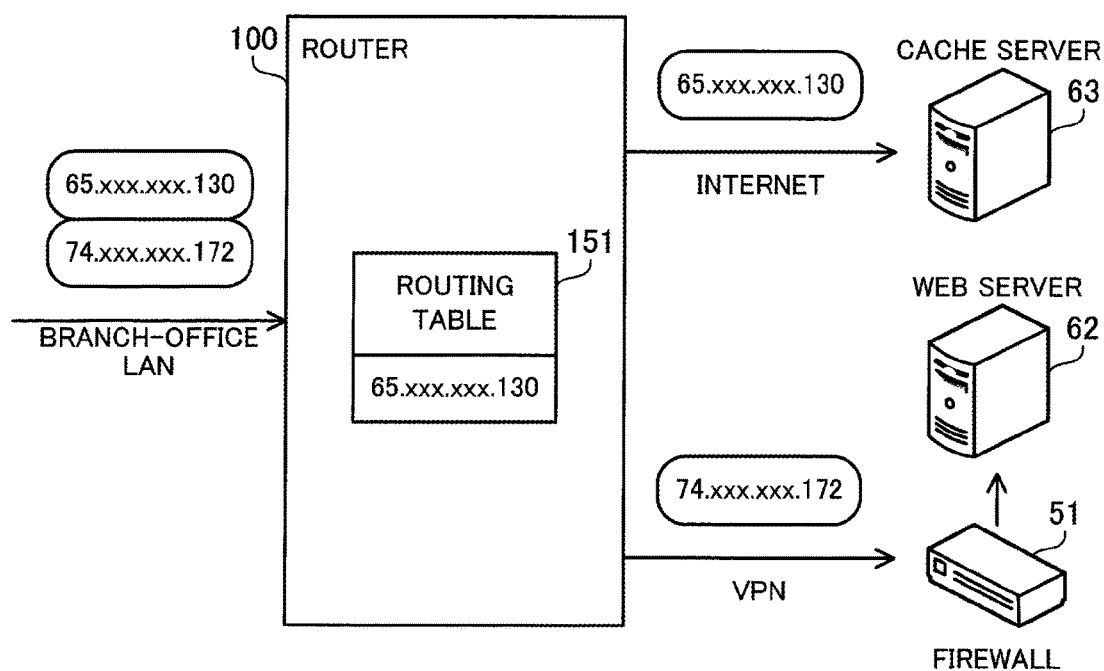
FIG. 9 illustrates an example of packet forwarding according to the third embodiment.

FIG. 9 illustrates an example of packet forwarding according to the third embodiment. This example is that the client 41 sends packets to the Internet 33 on the basis of the above results of the address resolution (packet forwarding phase). In addition, assume that "65.xxx.xxx.130" is registered in the routing table 151 of the router 100.

When the client 41 sends a packet that includes "65.xxx.xxx.130" as a destination, the router 100 confirms that the IP address of the destination is registered in the routing table 151. Therefore, the router 100 determines that the IP address is authoritative and then forwards the packet directly to the Internet 33, bypassing the firewall 51. The packet is forwarded to, for example, the destination cache server 63.

When the client 41 sends a packet that includes "74.xxx.xxx.172" as a destination, the router 100 confirms that the IP address of the destination is not registered in the routing table 151. Therefore, the router 100 determines that the IP address is not authoritative and then encapsulates the packet for the Internet VPN, and forwards the packet to the firewall 51 of the headquarters LAN 32 (over the Internet 33). The packet is, for example, inspected by the firewall 51 and is then forwarded to the destination Web server 62.

Figure 10:
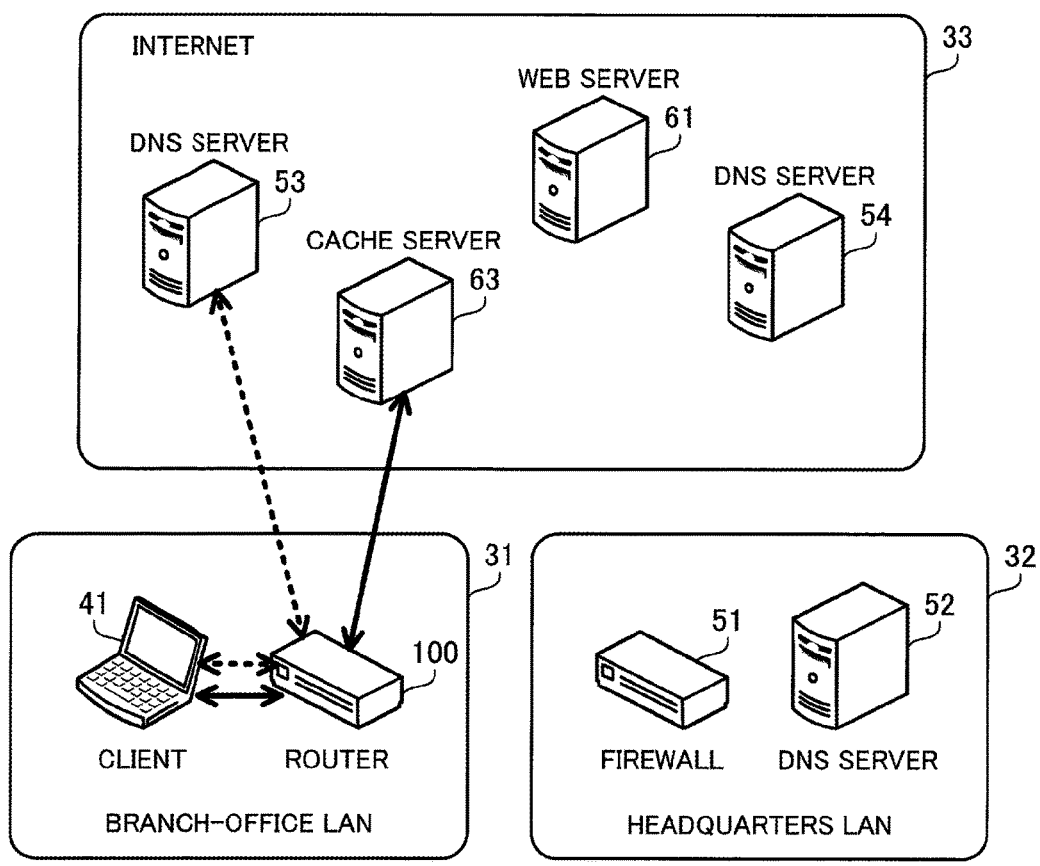
FIG. 10 is a first diagram illustrating an example of a communication sequence according to the third embodiment.

FIG. 10 is a first diagram illustrating an example of a communication sequence according to the third embodiment. This example is that the service provided by the Web server 61 is specified as an authoritative service, and the client 41 uses the service. In addition, accesses from the client 41 are redirected to the cache server 63 closer to the branch-office LAN 31.

When the client 41 sends a DNS request that specifies the FQDN of the Web server 61, the DNS request is forwarded to the DNS server 53 closer to the branch-office LAN 31, bypassing the headquarters LAN 32. With the cache service method as described above, the DNS server 53 searches for the IP address of the cache server 63 closer to the branch-office LAN 31, and returns a DNS response including the found IP address to the client 41.

The client 41 confirms that the IP address of the cache server 63 corresponds to the FQDN specified in the DNS request, and sends a packet including the IP address as a destination address. The packet sent from the client 41 is forwarded to the cache server 63, bypassing the headquarters LAN 32.

Figure 11:
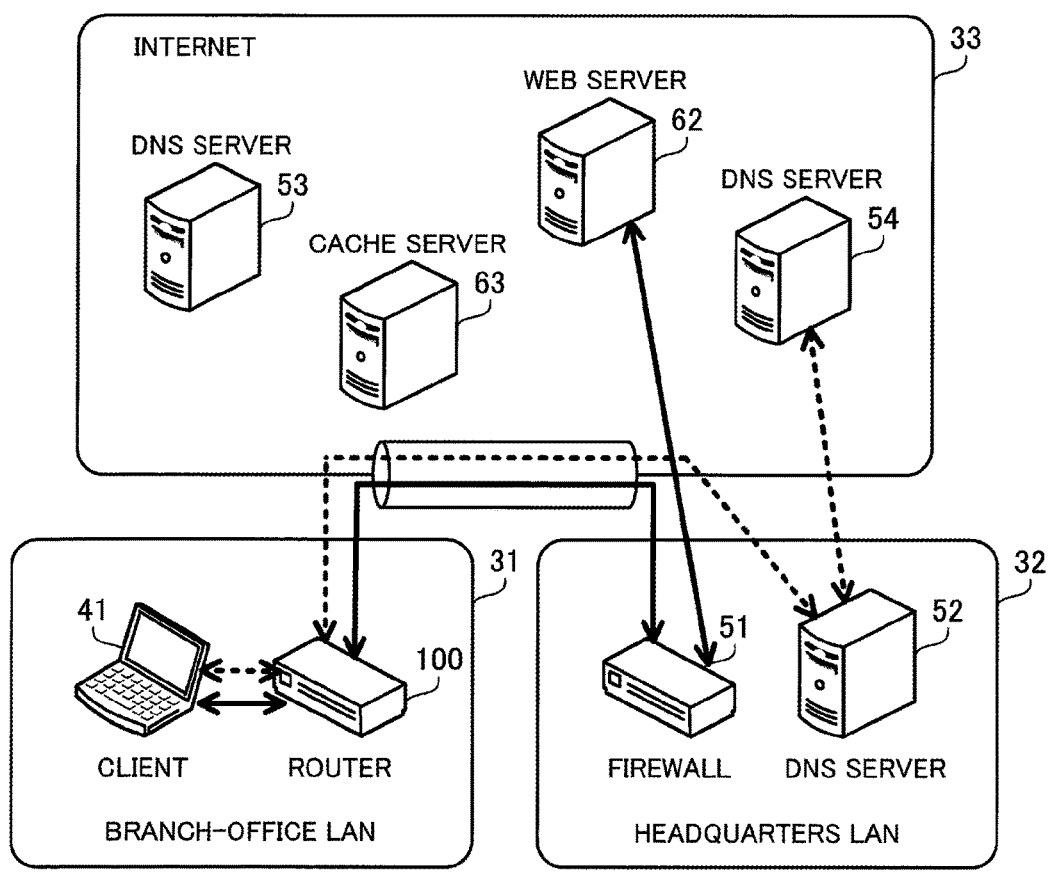
FIG. 11 is a second diagram illustrating an example of the communication sequence according to the third embodiment.

FIG. 11 is a second diagram illustrating an example of the communication sequence according to the third embodiment. This example is that the service provided by the Web server 62 is not specified as an authoritative service, and the client 41 uses the service. In addition, accesses to the Web server 62 are not blocked by the firewall 51.

When the client 41 sends a DNS request that specifies the FQDN of the Web server 62, the DNS request is forwarded to the DNS server 54 closer to the headquarters LAN 32 via the Internet VPN and the headquarters LAN 32. The DNS server 54 searches for the IP address of the Web server 62, and returns a DNS response including the found IP address to the client 41 via the headquarters LAN 32 and the Internet VPN.

The client 41 extracts the IP address of the Web server 62 from the DNS response, and sends a packet including the IP address as a destination address. The packet sent from the client 41 is forwarded to the Web server 62 via the Internet VPN and the firewall 51 of the headquarters LAN 32.

In the communication system of the third embodiment, it is easy to change the transmission path of a packet according to the authenticity of service. The router 100 is able to use host names including domain names to specify authoritative services. Unlike the case of just using IP addresses, it is possible to appropriately determine whether each packet is related to an authoritative service or not, even in the case where accesses from the clients 41 and 42 may be redirected to the cache servers 63 and 64.

Further, the router 100 may not need to perform application layer protocol processing on each packet, but may be designed to perform protocol processing at the IP layer and lower or at the TCP layer and lower. This reduces the workload of the router 100 for the protocol processing, and a high-cost communication apparatus may not need to be used as the router 100.

Still further, the transmission paths of packets from the clients 41 and 42 to the Internet 33 are controlled in such a manner that packets related to authoritative services bypass the firewall 51 of the intranet and the other packets pass through the firewall 51. Accordingly, compared with the case where all packets from the clients 41 and 42 to the Internet 33 are forwarded to the firewall 51, the workload of the firewall 51 is reduced.

(d) Fourth Embodiment

A fourth embodiment will be described next. The following mainly describes differences from the third embodiment, and the same features as the third embodiment will not be described again. A communication system of the fourth embodiment is realized with the same system configuration as FIG. 3, except that a router 100*a*, which will be described below, is used in place of the router 100 of the third embodiment.

Figure 12:
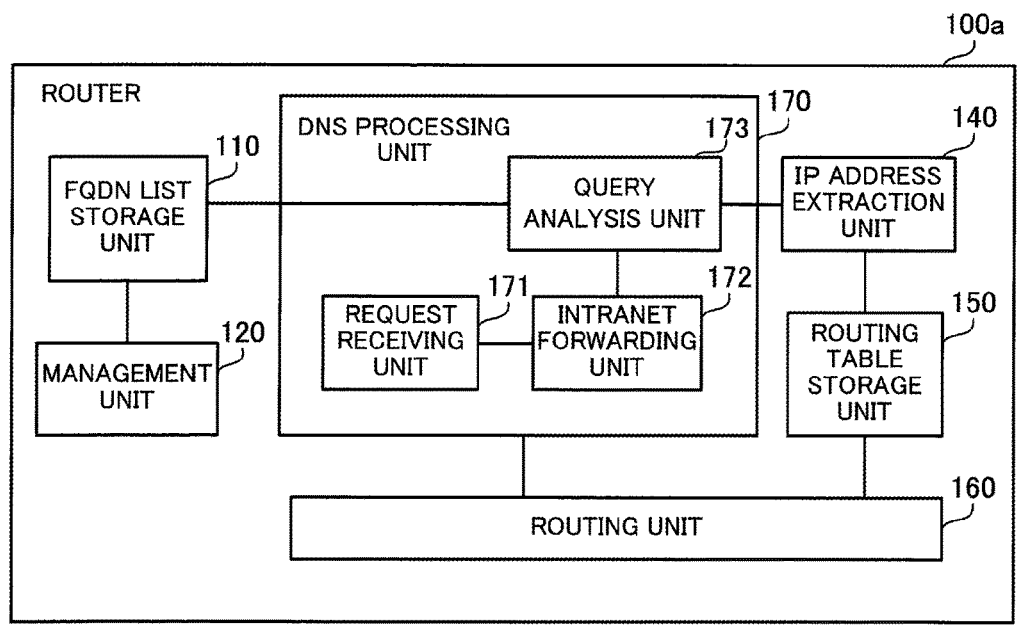
FIG. 12 is a block diagram illustrating an example of a software configuration according to a fourth embodiment.

FIG. 12 is a block diagram illustrating an example of a software configuration according to the fourth embodiment. In place of the DNS processing unit 130 of the router 100 of the third embodiment, the router 100*a* includes a DNS processing unit 170. The DNS processing unit 170 includes a request receiving unit 171, an intranet forwarding unit 172, and a query analysis unit 173.

The request receiving unit 171 receives DNS requests from clients 41 and 42, and returns DNS responses obtained from a headquarters LAN 32. The intranet forwarding unit 172 forwards the DNS requests received by the request receiving unit 171, to a DNS server 52 of the headquarters LAN 32, and obtains DNS responses to the DNS requests from the DNS server 52.

The query analysis unit 173 extracts a FQDN (a host name in a query section) specified by the client 41 and 42 from a DNS response received by the intranet forwarding unit 172. The query analysis unit 173 determines whether the extracted FQDN is registered in a FQDN list stored in a FQDN list storage unit 110 or not, i.e., whether the FQDN is the FQND of an authoritative service or not. If the FQDN is registered, the query analysis unit 173 outputs the DNS response to an IP address extraction unit 140. Otherwise, the query analysis unit 173 does not output the DNS response to the IP address extraction unit 140.

In the fourth embodiment, DNS requests are forwarded to the DNS server 52 of the headquarters LAN 32. Alternatively, such DNS requests may be forwarded to another specified DNS server.

Figure 13:
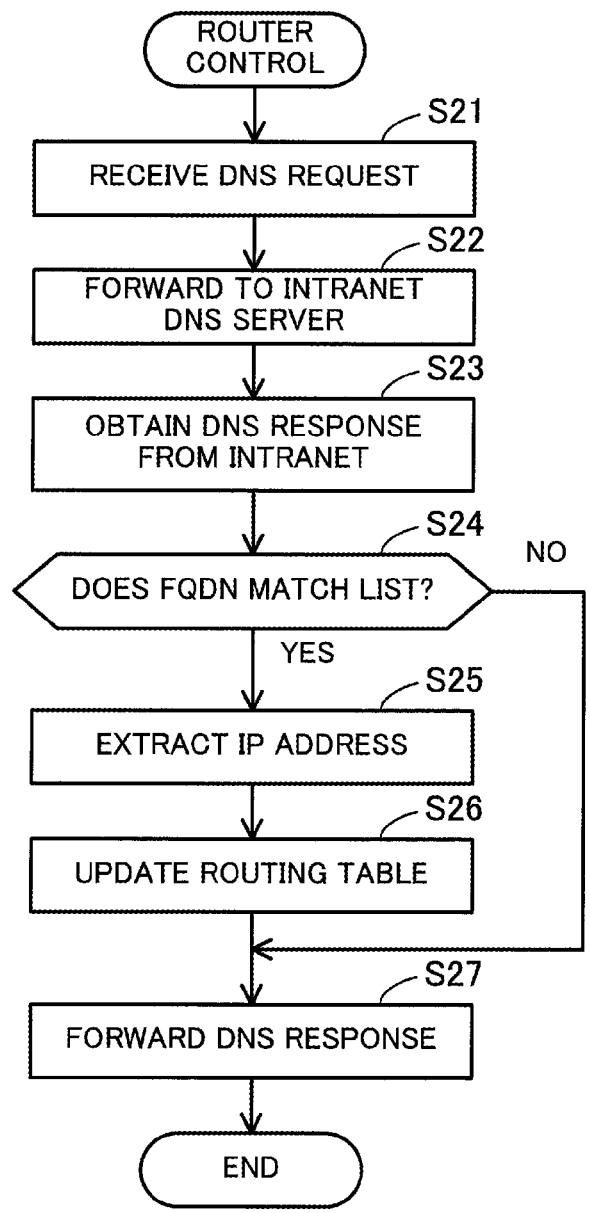
FIG. 13 is a flowchart illustrating router control according to the fourth embodiment.

FIG. 13 is a flowchart illustrating router control according to the fourth embodiment. This example is that the client 41 sends a DNS request.

(Step S21) The request receiving unit 171 receives the DNS request.

(Step S22) The intranet forwarding unit 172 forwards the DNS request to the DNS server 52 of the headquarters LAN 32. In this connection, the DNS request packet is encapsulated for the Internet VPN, and is forwarded between the router 100*a* and the headquarters LAN 32.

(Step S23) The intranet forwarding unit 172 receives a DNS response to the DNS request from the DNS server 52 of the headquarters LAN 32. Similarly to the DNS request, the DNS response packet is encapsulated for the Internet VPN and is forwarded.

(Step S24) The query analysis unit 173 extracts a FQDN from the DNS response, and compares the extracted FQDN with the FQDN list stored in the FQDN list storage unit 110. The query analysis unit 173 determines whether the FQDN extracted from the DNS response matches the FQDN list (is registered in the FQDN list) or not. If a match is found, the query analysis unit 173 determines that the FQDN is the FQDN of an authoritative service, and the process proceeds to step S25. If no match is found, the query analysis unit 173 determines that the FQDN is not the FQDN of an authoritative service, and the process proceeds to step S27.

(Step S25) The IP address extraction unit 140 extracts an IP address from the DNS response, and determines that the IP address is the IP address of an authoritative communication party.

(Step S26) The IP address extraction unit 140 registers the extracted IP address in the routing table stored in the routing table storage unit 150. In this connection, IP addresses corresponding to non-authoritative FQDNs are not registered in the routing table.

(Step S27) The request receiving unit 171 forwards the DNS response to the client 41 that has sent the DNS request. In this connection, the above steps S24 to S26 and step S27 may be executed in parallel, or these steps may be executed in a reverse order.

Figure 14:
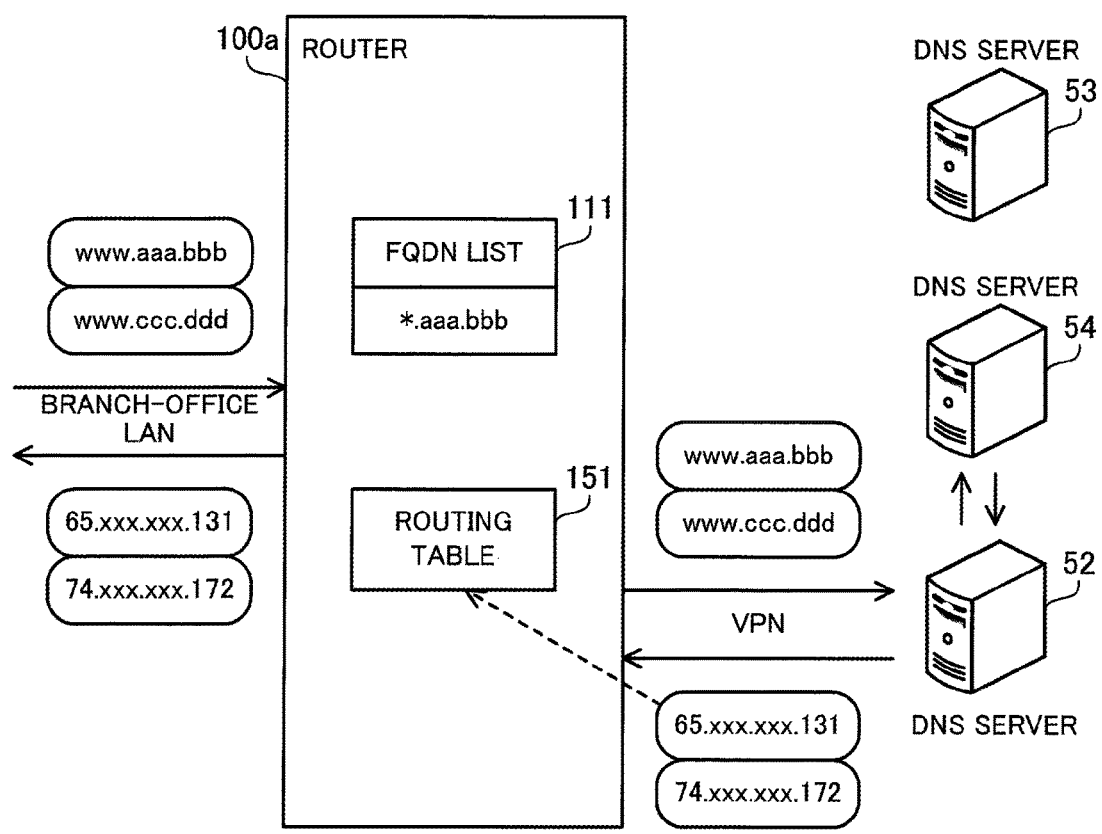
FIG. 14 illustrates an example of DNS processing according to the fourth embodiment.

FIG. 14 illustrates an example of DNS processing according to the fourth embodiment. This example is that the client 41 performs address resolution using the DNS (DNS phase). In addition, assume that "*.aaa.bbb" is registered in a FQDN list 111 of the router 100a.

When the client 41 sends a DNS request that specifies "www.aaa.bbb", the router 100a forwards the DNS request to the DNS server 52 of the headquarters LAN 32. The router 100a receives a DNS response including the FQDN specified in the DNS request and "65.xxx.xxx.131", and forwards the received DNS response to the client 41. At this time, the router 100a confirms that the FQDN included in the DNS response is registered in the FQDN list 111, and determines that the FQDN is authoritative. Then, the router 100a determines that the IP address included in the DNS response is authoritative, and registers the IP address in a routing table 151.

When the client 41 sends a DNS request that specifies "www.ccc.ddd", the router 100a forwards the DNS request to the DNS server 52 of the headquarters LAN 32. The router 100a receives a DNS response including the FQDN specified in the DNS request and "74.xxx.xxx.172", and forwards the received DNS response to the client 41. At this time, the router 100a confirms that the FQDN included in the DNS response is not registered in the FQDN list 111, and determines that the FQDN is not authoritative. Then, the router 100a determines that the IP address included in the DNS response is not authoritative, and so does not register the IP address in the routing table 151.

In this connection, when the client 41 sends packets on the basis of the above results of the address resolution (packet forwarding phase), the same routing as illustrated in FIG. 9 in the third embodiment is performed.

Figure 15:
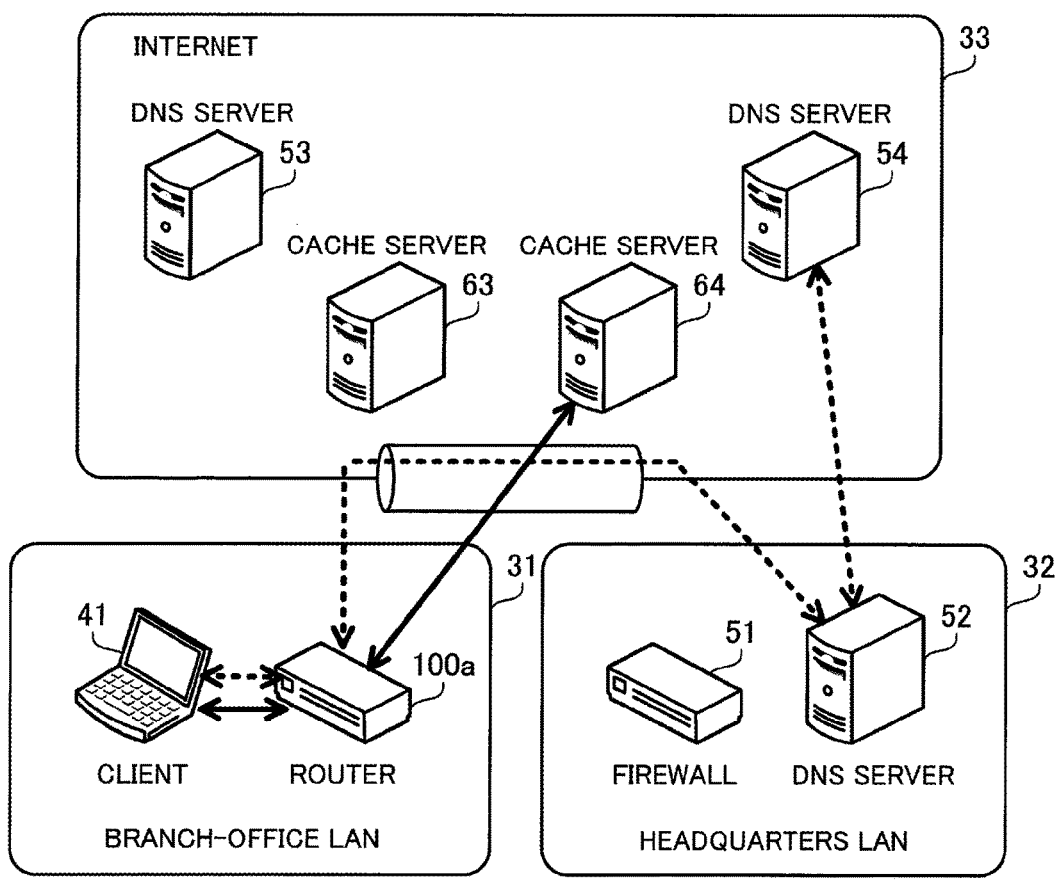
FIG. 15 illustrates an example of a communication sequence according to the fourth embodiment.

FIG. 15 illustrates an example of a communication sequence according to the fourth embodiment. This example is that the service provided by the Web server 61 is specified as an authoritative service and the client 41 uses the service. In addition, accesses from the client 41 are redirected to the cache server 64 closer to the headquarters LAN 32.

When the client 41 sends a DNS request that specifies the FQDN of the Web server 61, the DNS request is forwarded to the DNS server 54 closer to the headquarters LAN 32 via the Internet VPN and the DNS server 52 of the headquarters LAN 32. The DNS server 54 searches for the IP address of the cache server 64 closer to the headquarters LAN 32 with the cache service method as described earlier, and returns a DNS response including the found IP address to the client 41 via the DNS server 52 and the Internet VPN.

The client 41 confirms that the IP address of the cache server 64 corresponds to the FQDN specified in the DNS request, and sends a packet including the IP address as a destination address. The packet sent from the client 41 is forwarded to the cache server 64, bypassing the headquarters LAN 32.

Similarly to the third embodiment, in the communication system of the fourth embodiment, it is easy to change the transmission path of a packet according to the authenticity of service. The router 100a is able to use host names including domain names to specify authoritative services and to appropriately determine whether each packet is related to an authoritative service or not. In addition, it is possible to reduce the workload of the router 100a for the protocol processing, and a high-cost communication apparatus may not need to be used as the router 100a. Furthermore, the transmission paths are controlled in such a manner that packets related to authoritative services bypass the firewall 51, which reduces the workload of the firewall 51.

The following describes examples of communication systems different from those of the third and fourth embodiments.

Figure 16A:
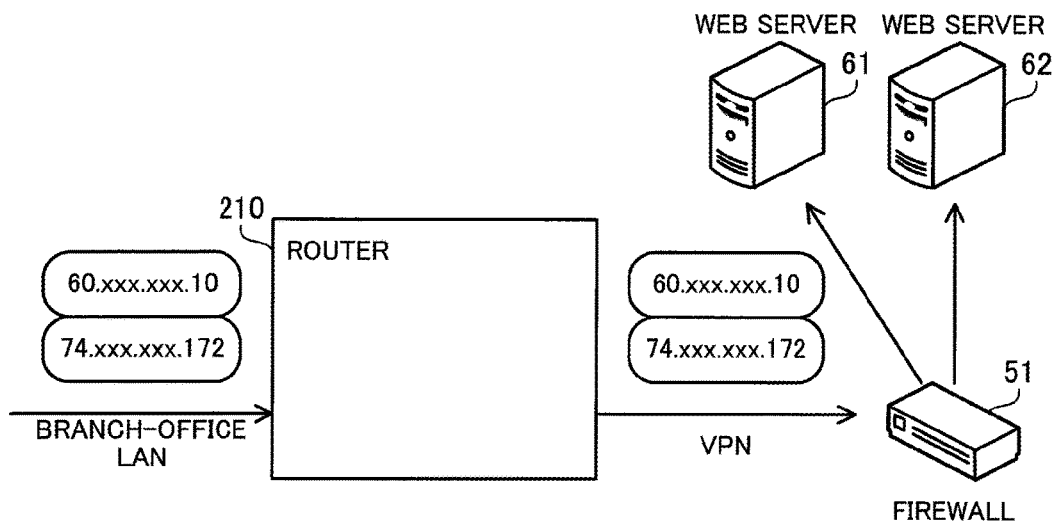
FIGS. 16A and 16B illustrate other examples of the communication sequence.
Figure 16B:
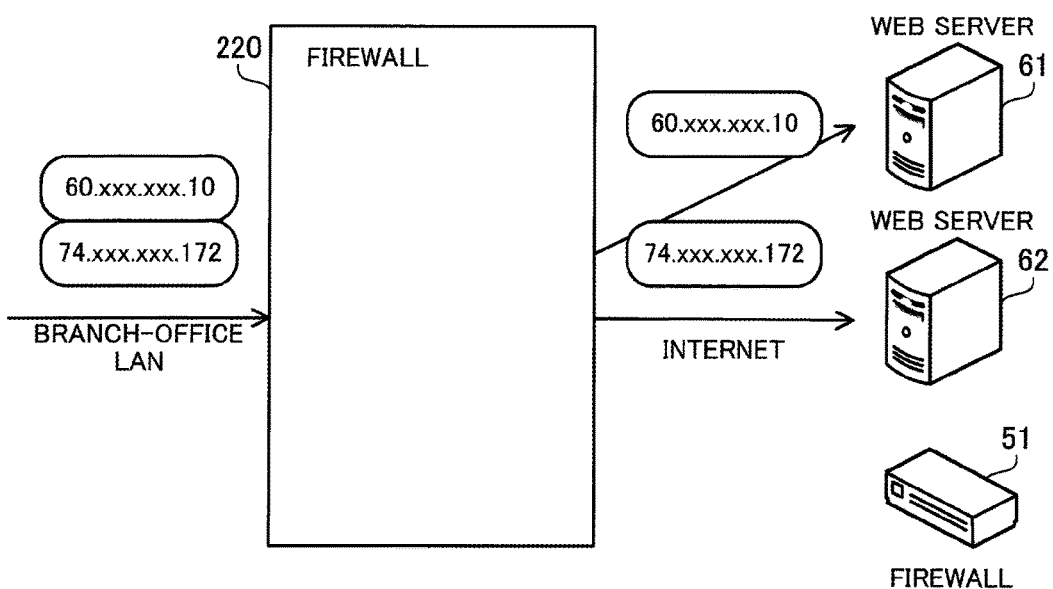

FIGS. 16A and 16B illustrate other examples of the communication sequence.

Such a communication system is considered that a router 210 installed in a branch-office LAN 31 forwards all packets sent from the clients 41 and 42 to the Internet 33, to a firewall 51, irrespective of their destination addresses (FIG. 16A). In this communication system, the workload of the router 210 may be reduced but the workload of the firewall 51 of a headquarters LAN 32 may increase.

In addition, another communication system is also considered in which a firewall 220 having the same functions as the firewall 51 is installed in a branch-office LAN 31, and packets from the clients 41 and 42 to the Internet 33 are processed in the firewall 220, without being forwarded to the firewall 51 (FIG. 16B). In this communication system, the workload of the firewall 51 may be reduced, but a sophisticated communication apparatus like the firewall 220 may be needed for every branch office, and so this system is disadvantageous in terms of cost.

Figure 17A:
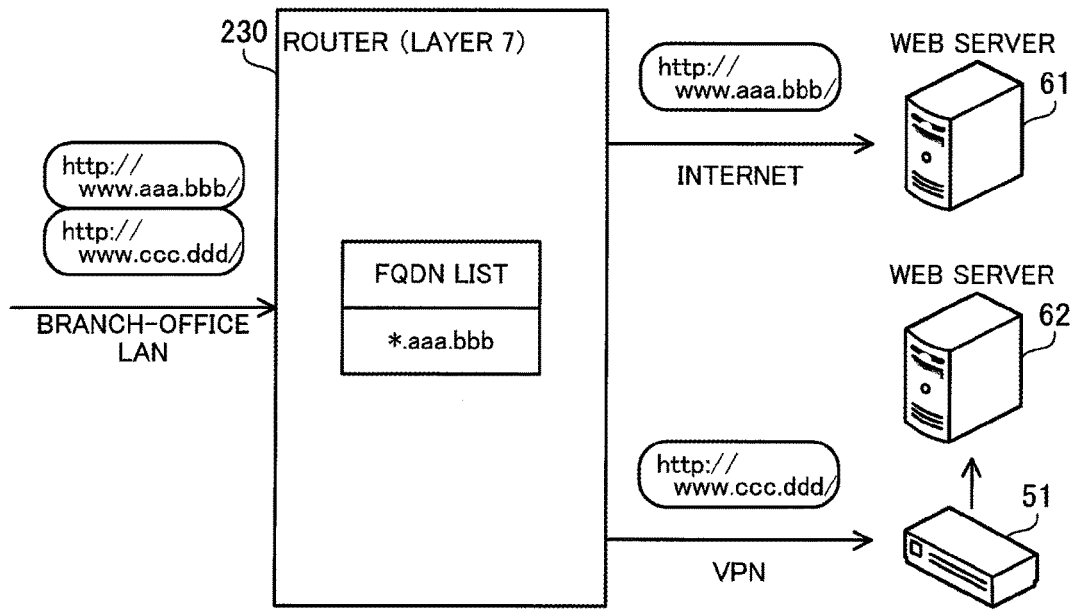
FIGS. 17A and 17B illustrate other examples of the packet forwarding.
Figure 17B:
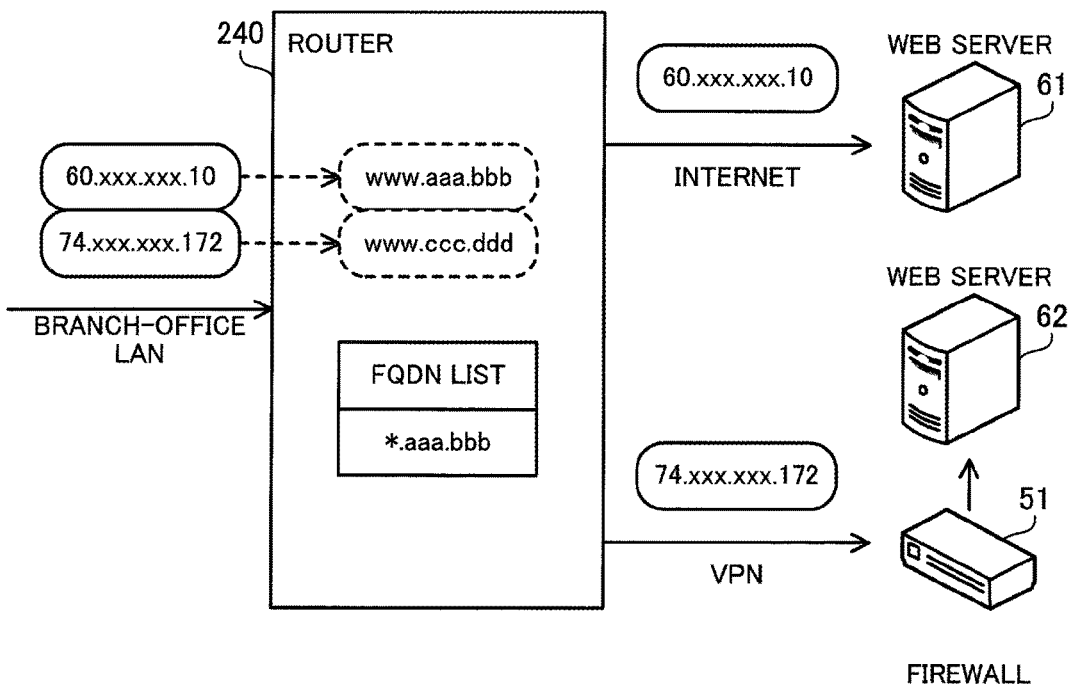

FIGS. 17A and 17B illustrate other examples of the packet forwarding.

Such a communication system is considered that a router 230 that performs layer 7 protocol processing is installed in a branch-office LAN 31, and the router 230 extracts a FQDN from a layer 7 session, such as an HTTP session, and performs routing according to the authenticity of the FQDN (FIG. 17A). In this communication system, it is easy to determine the authenticity of services but the workload of the router 230 increases. In addition, a sophisticated communication apparatus may be needed for every branch office, and so this system is disadvantageous in terms of cost.

In addition, another communication system is also considered in which a router 240 installed in a branch-office LAN 31 translates an IP address that is the destination address of a packet into a FQDN by making a reverse DNS query, and routes the packet according to the authenticity of the obtained FQDN (FIG. 17B). In this communication system, transmission paths may not be controlled appropriately if the FQDN specified in a forward query does not match the FQDN obtained by making the reverse query, as in the case where the IP address of a cache server is returned in response to a forward DNS query.

By contrast, in the communication systems of the third and fourth embodiments, the routers 100 and 100a are able to appropriately control the transmission paths of packets according to the authenticity of services, as described above. In addition, it is possible to reduce the workload of the firewall 51 of the headquarters LAN 32, and low-cost communication apparatuses may be used as the routers 100 and 100a.

It is easy to change the transmission paths of packets according to the authenticity of services.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A routing method comprising:
    determining, upon receiving an address resolution query including a full qualified domain name from a client device, whether direct routing to a first network is allowed, based on the full qualified domain name;
    transmitting the address resolution query to the first network when the direct routing is determined to be allowed, and transmitting the address resolution query to a second network when the direct routing is determined not to be allowed; and
    transmitting, to the client device, an address response obtained from the first network or the second network in response to the address resolution query, the address response including an Internet Protocol address,
    wherein a packet received from the client device and including the Internet Protocol address as a destination address is forwarded to the first network by bypassing the second network when the address response including the Internet Protocol address is obtained from the first network, and the packet is forwarded to the first network via the second network when the address response including the Internet Protocol address is obtained from the second network.

2. The routing method according to claim 1, further comprising:
    configuring, when the address response is obtained from the first network, a routing table such that the packet is forwarded to the first network; and
    configuring, when the address response is obtained from the second network, the routing table such that the packet is forwarded to the second network.

3. The routing method according to claim 2, further comprising:
    forwarding the packet to the first network or the second network with reference to the routing table.

4. A network transmission apparatus comprising:
    a communication interface configured to communicate with a client device, a first network and a second network; and
    a controller configured to perform a procedure including:
        determining, upon receiving an address resolution query including a full qualified domain name from the client device, whether direct routing to the first network is allowed, based on the full qualified domain name;
        transmitting the address resolution query to the first network through the communication interface when the direct routing is determined to be allowed, and transmitting the address resolution query to the second network through the communication interface when the direct routing is determined not to be allowed; and
        transmitting, to the client device through the communication interface, an address response obtained from the first network or the second network in response to the address resolution query, the address response including an Internet Protocol address,
        wherein a packet received from the client device and including the Internet Protocol address as a destination address obtained from the first network is forwarded to the first network by bypassing the second network when the address response including the Internet Protocol address is obtained from the first network, and the packet is forwarded to the first network via the second network when the address response including the Internet Protocol address is obtained from the second network.

5. A non-transitory computer-readable medium storing a computer program, the computer program causing a computer to perform a procedure comprising:
    determining, upon receiving an address resolution query including a full qualified domain name from a client device, whether direct routing to a first network is allowed, based on the full qualified domain name;
    transmitting the address resolution query to the first network when the direct routing is determined to be allowed, and transmitting the address resolution query to a second network when the direct routing is determined not to be allowed; and
    transmitting, to the client device, an address response obtained from the first network or the second network in response to the address resolution query, the address response including an Internet Protocol address,
    wherein a packet received from the client device and including the Internet Protocol address as a destination address is forwarded to the first network by bypassing the second network when the address response including the Internet Protocol address is obtained from the first network, and the packet is forwarded to the first network via the second network when the address response including the Internet Protocol address is obtained from the second network.

* * * * *